(12) United States Patent
Leung

(10) Patent No.: US 7,330,184 B2
(45) Date of Patent: Feb. 12, 2008

(54) SYSTEM AND METHOD FOR RECOGNIZING CONNECTOR GESTURES

(75) Inventor: Andy Leung, Calgary (CA)

(73) Assignee: SMART Technologies ULC (CA)

( * ) Notice: Subject to any disclaimer, the term of this patent is extended or adjusted under 35 U.S.C. 154(b) by 504 days.

(21) Appl. No.: 10/171,099

(22) Filed: Jun. 12, 2002

(65) Prior Publication Data
US 2003/0231219 A1 Dec. 18, 2003

(51) Int. Cl.
G06T 11/20 (2006.01)
(52) U.S. Cl. ...................................... 345/441
(58) Field of Classification Search ................ 345/441, 345/442, 443
See application file for complete search history.

(56) References Cited

U.S. PATENT DOCUMENTS

| 5,299,307 | A | * | 3/1994 | Young | 715/861 |
| 5,448,263 | A | | 9/1995 | Martin | 345/173 |
| 5,517,604 | A | * | 5/1996 | Yuura et al. | 345/441 |
| 5,636,297 | A | | 6/1997 | Eller et al. | 382/293 |
| 5,969,699 | A | * | 10/1999 | Balram et al. | 345/10 |
| 5,999,186 | A | * | 12/1999 | Jackson | 345/420 |
| 6,233,351 | B1 | | 5/2001 | Feeney et al. | 382/155 |
| 6,239,813 | B1 | | 5/2001 | Erskine | 345/440 |
| 6,243,101 | B1 | | 6/2001 | Erskine | 345/619 |
| 2001/0010519 | A1 | | 8/2001 | Erskine | |
| 2001/0035872 | A1 | | 11/2001 | Erskine | |
| 2002/0154117 | A1 | * | 10/2002 | Saitou | 345/440 |
| 2003/0206169 | A1 | * | 11/2003 | Springer et al. | 345/442 |

OTHER PUBLICATIONS

Hammond et al, "Tahuti: A Sketch Recognition System for UML Class Diagrams", AAAI Spring Symposium, 2002.*
Hansen et al, "Tool support for collaborative teaching and learning of object-oriented modeling", ITiCSE Jun. 2002, ACM, p. 146-150.*

* cited by examiner

Primary Examiner—Ryan Yang
(74) Attorney, Agent, or Firm—Beyer Weaver LLP

(57) ABSTRACT

A touch system includes a touch panel having a touch surface and a projector presenting images onto the touch surface. A computer executing an applications program is coupled to the touch panel and the projector. The computer is responsive to contact output generated by the touch panel in response to proximity of a pointer to the touch surface and updates image data conveyed to the projector so that images presented on the touch surface reflect pointer activity. The computer executes a gesture connector recognition routine. The gesture connector recognition routine performs recognition to convert a freehand connector on the touch surface into a computer-generated connector approximating the freehand connector.

6 Claims, 7 Drawing Sheets

SYSTEM AND METHOD FOR RECOGNIZING CONNECTOR GESTURES

FIELD OF THE INVENTION

The present invention relates generally to touch systems and in particular to a system and method for recognizing connector gestures.

BACKGROUND OF THE INVENTION

Touch systems are well known in the art and many variations exist. In all cases, touch systems include a touch panel having a touch surface on which contacts are made using a pointer. Pointer contacts with the touch surface are detected and are used to generate corresponding output that represent the positions on the touch surface where contacts are made. The contact position output is typically fed to a computer that executes one or more applications programs. The computer generates image data that is used to present images on the touch surface. The computer uses the contact position output to update the image data and thus, the images presented on the touch surface. In this manner, the images presented on the touch surface are updated to reflect the activity of the pointer on the touch surface.

For example, U.S. Pat. No. 5,448,263 to Martin, assigned to the assignee of the present invention, discloses a passive analog resistive touch panel coupled to a computer. The computer provides image data to a projector that projects images onto the touch surface of the touch panel. The touch panel includes a tool tray that supports a plurality of differently coloured pens. When a user contacts the touch surface either with a finger, other pointer or a pen, the touch panel outputs signals representing the contact position on the touch surface. The contact position data is conveyed to the computer and is mapped to the computer display. If a finger or other pointer is used to contact the touch surface, the touch system operates in a pointer mode and the contact position data is treated as a mouse event. This allows the user to operate the computer in a manner similar to using a computer mouse i.e. select menus, manipulate objects etc. simply by contacting the touch surface. If a pen is lifted from the tool tray and is used to contact the touch surface, the touch system operates in an ink mode and the contact position data is recorded as writing or drawing.

When the computer is running an applications program in a Windows environment, a computer desktop image is presented on the touch surface that includes icons representing the various applications programs available for selection. When an icon is selected, a window for the selected applications program is opened. The window typically includes a frame, one or more tool bars, optional scroll bars and an active area surrounded by the frame, tool bars and scroll bars. As mentioned above, in the pointer mode, contacts on the touch surface are treated as mouse event input to the computer desktop. The computer in response to the mouse event input controls the computer desktop or selected applications program according to the touch panel output and updates the image data conveyed to the projector for display to reflect the pointer activity.

In the ink mode, an acetate image identical to the computer desktop image overlies the computer desktop image to provide a surface on which ink can be drawn. When a pen contacts the touch surface, the contact position data is treated as writing or drawing (herein referred to as "writing"). In this case, the computer updates the image data conveyed to the projector for display so that the writing is displayed on the acetate image.

In the ink mode, users often draw two-dimensional diagrams on the touch surface such as flowcharts, schematics, process maps etc. in addition to writing text. These two-dimensional diagrams typically include a plurality of graphical objects such as rectangles, squares, diamonds, ovals and circles interconnected by straight, curved or serpentine lines. Generally, two-dimensional diagrams drawn by freehand are unclear. As a result software has been developed to assist users in the creation of two-dimensional diagrams.

For example, computer-aided design (CAD) software programs are available to assist users in the creation of two-dimensional diagrams. One common CAD software program is sold by Autodesk Inc. under the name "AutoCAD". During use of this CAD software, a user creates a two-dimensional diagram either by placing an existing graphical object on a pallet that is taken from a collection or library of such graphical objects, or by creating a new graphical object. Interconnecting lines or connections, are then manually drawn from a point on or near the graphical object to the appropriate destinations. Every point along the path of the connection must be specified by the user. This is a very tedious process, and must be repeated every time the position, rotational orientation, size or other parameter of any graphical object is changed.

Software is also widely available that automates the manipulation and interconnection of graphical objects so that when a user changes the position or other parameter of a graphical object, all connections and/or graphical objects associated with that graphical object reconfigure themselves to maintain that association. Such software is available from Visio Corp. under the name "Visio Technical". Complex connections of this nature can be created between graphical objects by simply picking start and end points for the connections.

Complex connections allow a user to edit a diagram more easily. However, the creation of complex connections requires several steps. Typically, the user must first select the graphical object where the complex connection is to originate and then select the graphical object where the complex connection is to terminate. Often, the user is required to specify the shape of the complex connection path between the two graphical objects. It is also common for the user to be required to specify the exact locations of the start and end points of the complex connection. As will be appreciated, alternative systems to enhance interpretation of connectors are desired.

It is therefore an object of the present invention to provide a novel system and method for recognizing connector gestures.

SUMMARY OF THE INVENTION

According to one aspect of the present invention there is provided a method of recognizing a freehand connector input into a computer comprising the steps of:

examining points along said freehand connector to determine the shape thereof, and replacing said freehand connector with a computer-generated connector approximating said freehand connector.

Preferably, the method further comprises the step of determining whether the start and end points of the freehand connector are proximate to graphical objects and if so, extending the computer-generated connector between the graphical objects. It is also preferred that the method further comprises the step of generating new graphical objects at the start and end points of the computer-generated connector if the start and end points of the freehand connector are not proximate to graphical objects.

According to another aspect of the present invention there is provided a system for recognizing a freehand connector input into a computer comprising:

means for examining points along said freehand connector to determine the shape thereof; and means for replacing said freehand connector with a computer-generated connector approximating said freehand connector.

According to yet another aspect of the present invention there is provided a touch system comprising:

a touch panel having a touch surface;

a projector presenting images onto said touch surface; and a computer executing an applications program and being coupled to said touch panel and said projector, said computer being responsive to contact output generated by said touch panel in response to proximity of a pointer to said touch surface and updating image data conveyed to said projector so that images presented on said touch surface reflect pointer activity, said computer executing a connector gesture recognition routine, said connector gesture recognition routine performing recognition to convert a freehand connector on said touch surface into a computer-generated connector approximating said freehand connector.

According to still yet another aspect of the present invention there is provided a computer program product including a computer readable medium having a computer program for recognizing a freehand connector input into a computer embodied thereon, said computer program including:

computer program code for examining points along said freehand connector to determine the shape thereof; and computer program code for replacing said freehand connector with a computer generated connector approximating said freehand connector.

The present invention provides advantages in that freehand connectors are automatically recognized and replaced with computer-generated connectors. As a result user input during creation of diagrams is reduced. The freehand connector simply needs to be drawn by the user.

BRIEF DESCRIPTION OF THE DRAWINGS

Embodiments of the present invention will now be described more fully with reference to the accompanying drawings in which.

DETAILED DESCRIPTION OF THE PREFERRED EMBODIMENT

Figure 1:
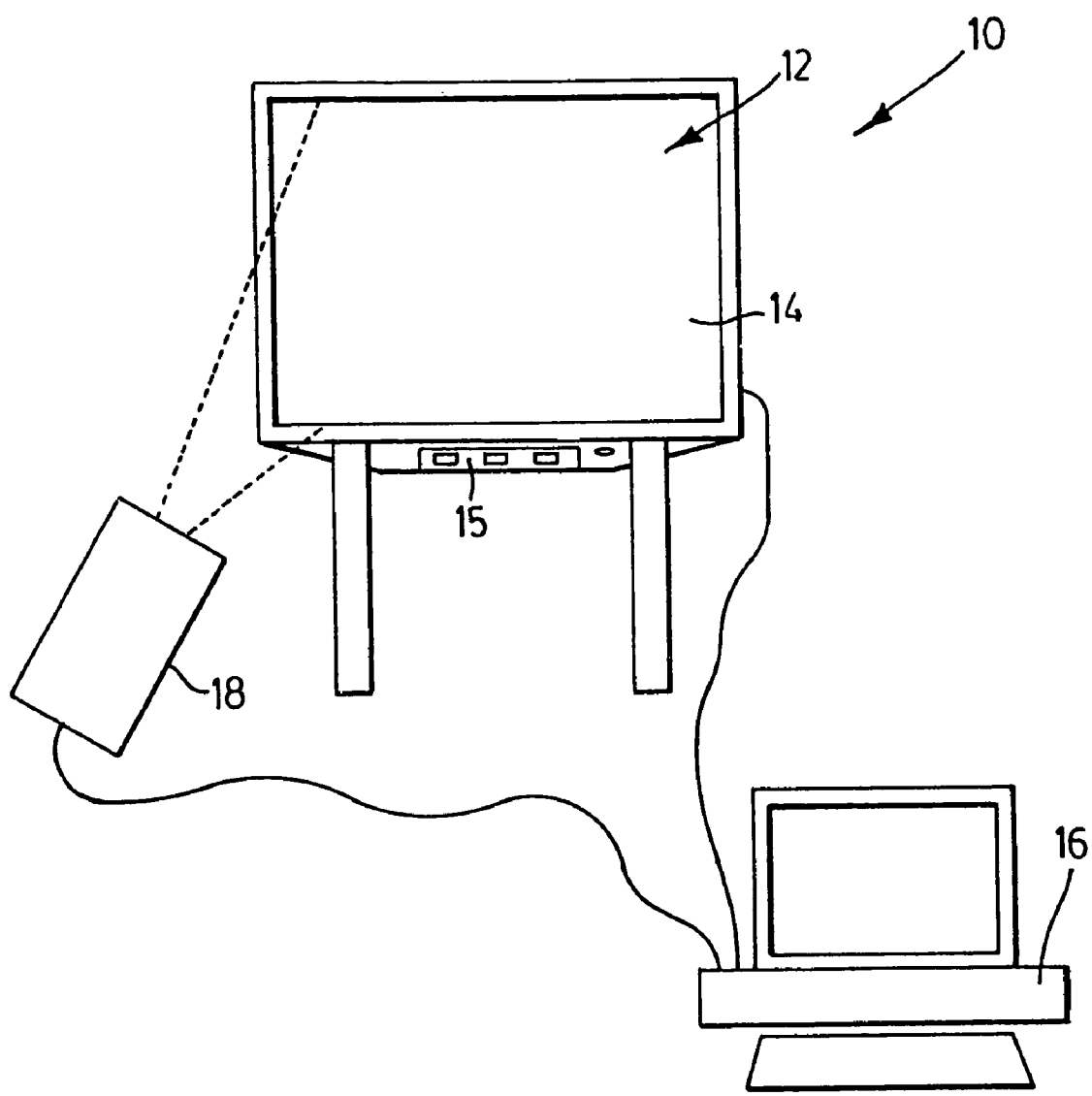
FIG. 1 is a schematic diagram of an interactive display system including a touch panel having a touch surface.

Turning now to FIG. 1, an interactive touch system similar to that disclosed in U.S. Pat. No. 5,448,263 to Martin is shown and is generally identified by reference numeral 10. As can be seen, touch system 10 includes a touch panel 12 having a touch surface 14. The touch panel 12 in this embodiment is of the analog resistive type and includes a tool tray 15 that supports a plurality of differently coloured pens (not shown). Touch panel 12 is responsive to contacts on the touch surface 14 made using either a finger, other pointer or pen and generates output representative of the locations on the touch surface 14 where contacts are made. The contact position output of the touch panel 12 is fed to a computer 16 executing one or more applications programs and is treated either as mouse events or writing depending on the object used to contact the touch surface 14. Specifically, the contact position output of the touch panel 12 is treated as mouse events if a finger or other pointer is used to contact the touch surface 14. The contact position is however treated as writing when a pen is lifted from the tool tray 15 and is used to contact the touch surface 14. In this manner the touch system either operates in a pointer mode or ink mode depending on the object used to contact the touch surface 14. The computer 16 is also coupled to a front or rear projector 18 and provides image data to the projector. The projector 18 in turn presents images on the touch surface 14 of the touch panel. The touch panel 12, computer 16 and projector 18 form a closed-loop so that user contacts with the touch panel 12 can be recorded as writing or used to control execution of an applications program executed by the computer 16.

In the present embodiment, the computer 16 runs in a Windows environment and provides image data to the projector 18 so that a computer desktop image is presented on the touch surface 14. The computer desktop image presents one or more icons that can be selected to open associated applications programs. When an applications program is selected, a window for the applications program is opened.

Figure 2:
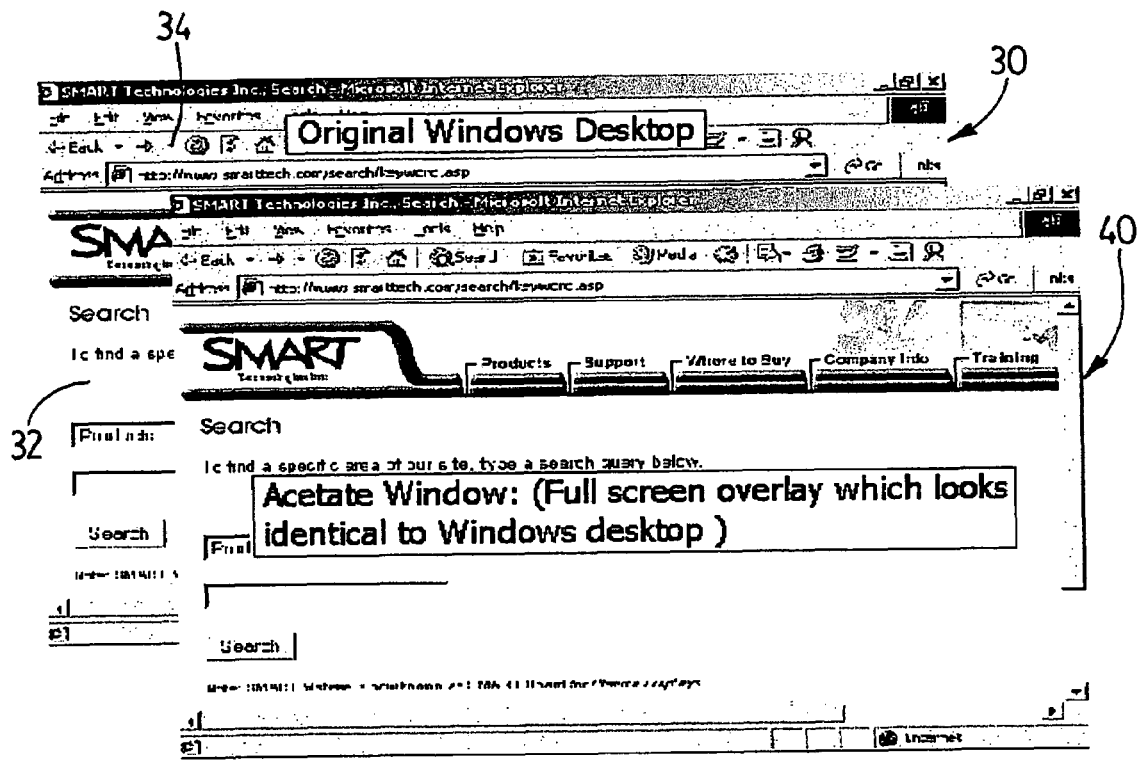
FIG. 2 is a view of a computer desktop image together with an acetate image on the touch surface of the touch panel.

FIG. 2 shows an applications program window 30 including an active area 32 bordered by a frame and one or more tool bars 34 is shown presented on the touch surface 14. When a pen is used to contact the touch surface 14 and the touch system is conditioned to the ink mode, an acetate image 40 identical to the computer desktop image is displayed over the computer desktop image as shown FIG. 2. The acetate image 40 provides a surface for writing (commonly referred to as "ink") so that the ink is not used by the computer 16 to update the underlying computer desktop image 30. Contact position data returned to the computer 16 by the touch panel 12 in response to pen contacts with the touch surface 14 are used by the computer to update the image data conveyed to the projector 18 so that the ink appears on the acetate image 40.

Figure 3A:
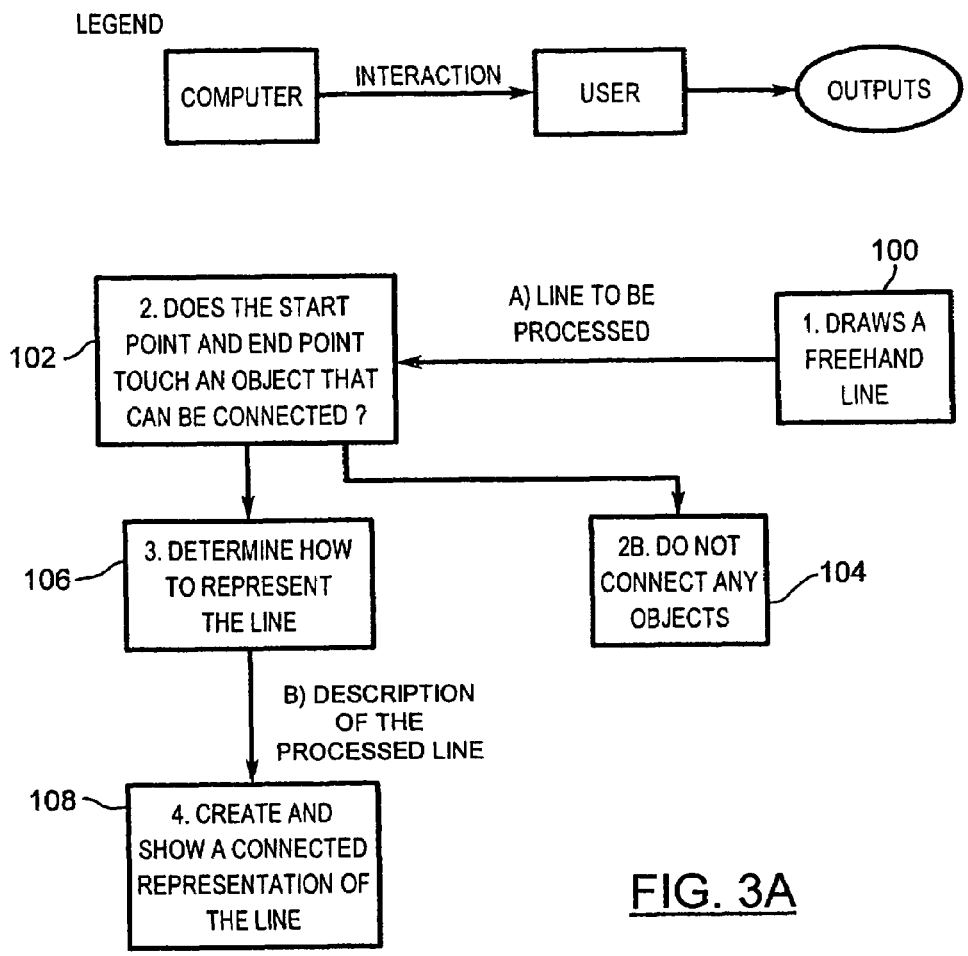
FIGS. 3a to 3c are flowcharts showing the steps performed by a connector gesture recognition routine.
Figure 3B:
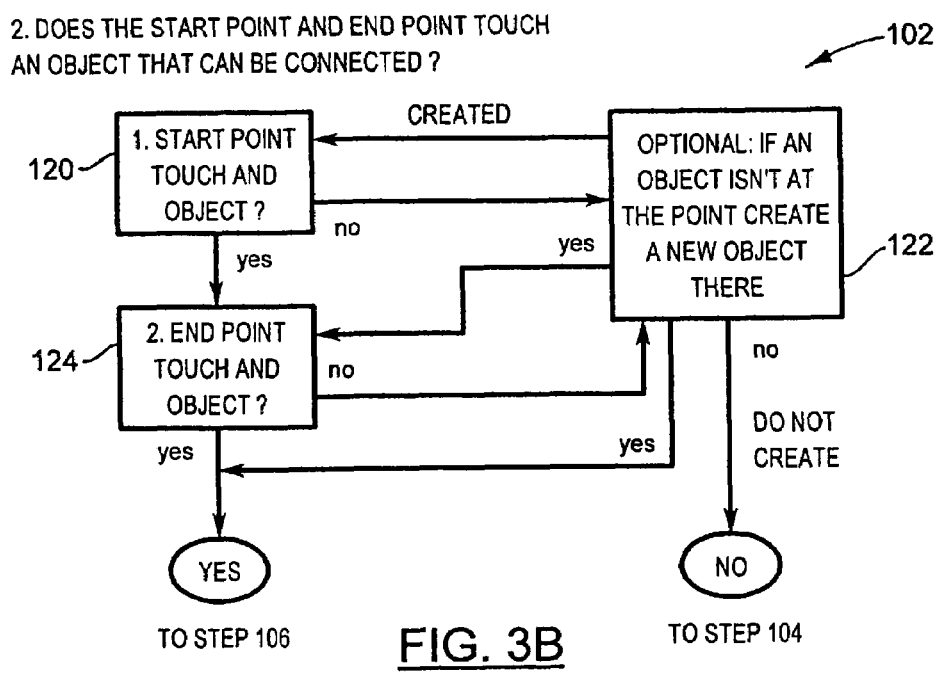
Figure 3C:
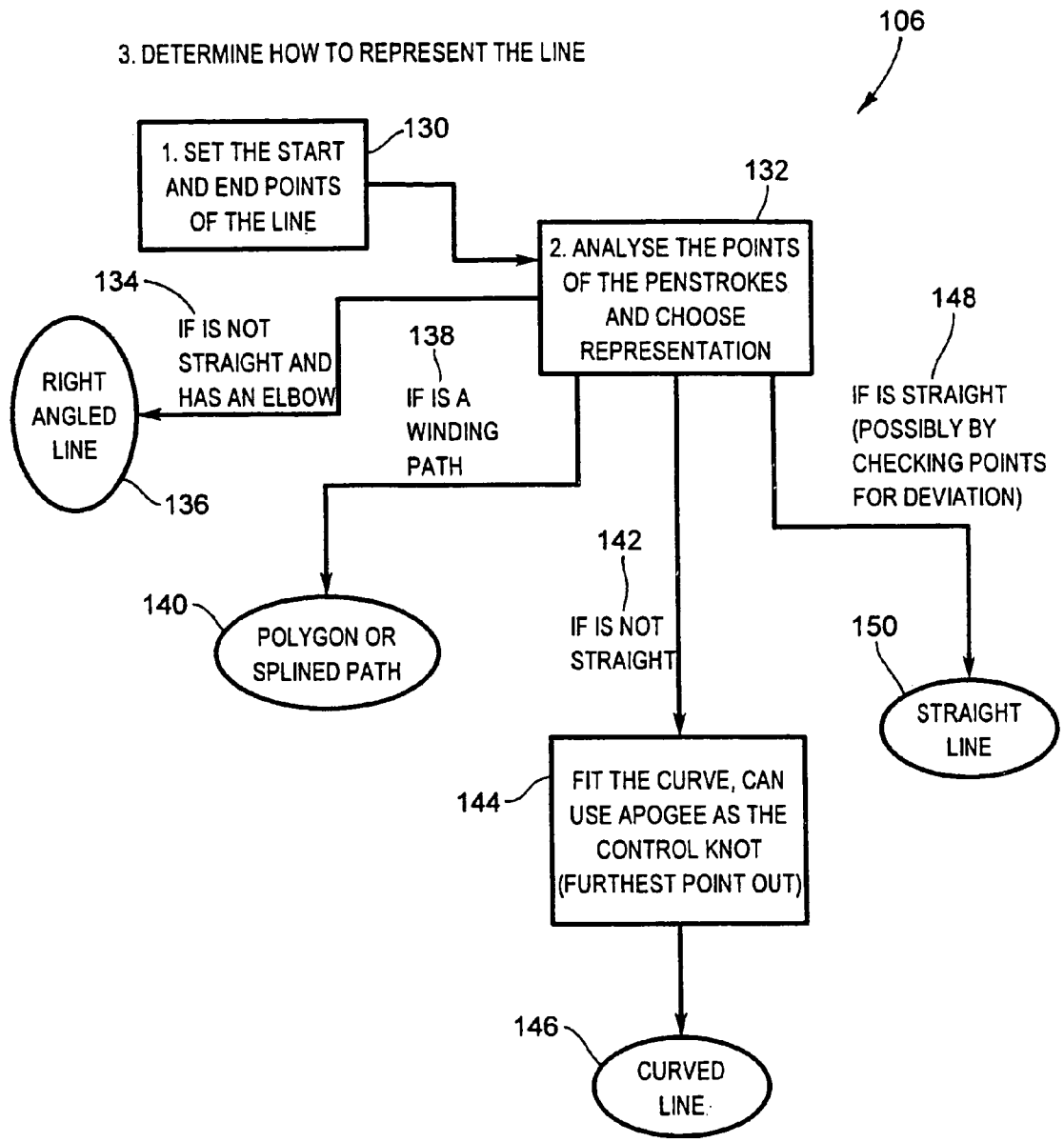

When the touch system 10 is conditioned to the ink mode, the computer 16 can be conditioned to execute a connector gesture recognition routine to interpret freehand connectors drawn between graphical objects, if the user is using the pen to draw a two-dimensional diagram, by selecting an icon presented on the touch surface 14. Specifics of the connector gesture recognition routine will now be described with reference to FIGS. 3a to 3c.

With the computer 16 is executing the gesture connector recognition routine, when a user draws a freehand line on the touch surface 14 (step 100) and the touch panel output is conveyed to the computer 16, the connector gesture recognition routine examines the start point and end point of the freehand line to determine if the start point and end point of the freehand line touch graphical objects displayed on the touch surface that can be connected (step 102). If the start point and end point of the freehand line do not touch graphical objects that can be connected, the freehand line is maintained in its original form (step 104). If the start point and end point of the freehand line touch graphical objects that can be connected, a connector gesture determination is made to determine the manner by which the freehand line is to be represented (step 106). The freehand line is then replaced by the determined computer-generated connector and the image data conveyed to the projector 18 is updated accordingly so that the computer-generated connector approximating the freehand line is presented on the touch surface 14 (step 108).

During step 102 when the start point and end point of the freehand line are examined, initially the start point is examined to determine if it touches a graphical object (step 120). If the start point of the freehand line does not touch a graphical object, the user is presented with a prompt to determine if a new graphical object is to be created at the start point of the freehand line (step 122). If the user does not wish a new graphical object to be created, the connector gesture recognition routine proceeds to step 104.

If the start point of the freehand line touches a graphical object or if the user conditions the connector gesture recognition routine to create a new graphical object at the start of the freehand line, the connector gesture recognition routine examines the end point of the freehand line to determine if it touches a graphical object (step 124). If not, the connector gesture recognition routine proceeds to step 122 to determine if the user wishes to create a new graphical object at the end of the freehand line. If the end point of the freehand line touches a graphical object or if the user conditions the connector gesture recognition routine to create a new graphical object at the end of the freehand line, the connector gesture recognition routine proceeds to step 106 to determine how to represent the freehand line. Otherwise, the connector gesture recognition routine proceeds to step 104.

During step 106, the connector gesture recognition routine sets the start and end points of the freehand line (step 130) and analyzes points along the freehand line in order to select an appropriate representation (step 132). Based on the analysis, if the freehand line is not a straight line and is determined to have an elbow along its length (step 134), the connector gesture recognition routine recognizes the freehand line as a right-angled line (step 136). If the line has a winding path (step 138), the connector gesture recognition routine recognizes the freehand line either as a polygonal, splined or circular line depending on the shape of the freehand line (step 140). If the freehand line is not straight nor winding (step 142), the connector gesture recognition routine recognizes the freehand line as a curved line (step 146). The curve is fitted using an apogee as the control knot (i.e. the furthest point out away from the graphical objects). If the freehand line is straight (step 148), the connector gesture recognition routine recognizes the freehand line as a straight line (step 150). Once the freehand line has been recognized, the connector gesture recognition routine replaces the freehand line with a computer-generated equivalent and updates the image data conveyed to the projector 18 so that the appropriate computer-generated connector is displayed on the touch surface 14.

Figure 4:
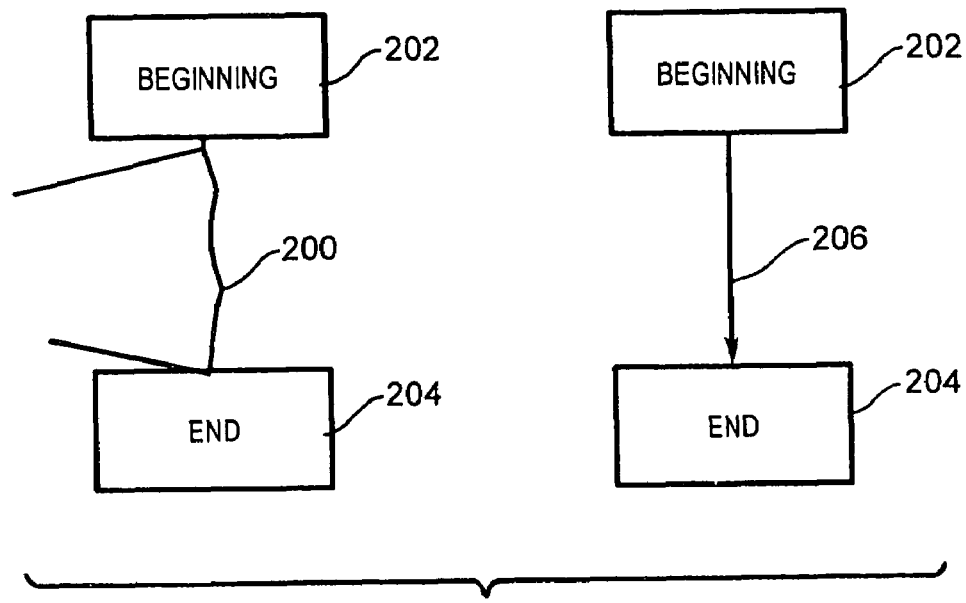
FIGS. 4 to 10 are views showing freehand connectors drawn on the touch surface and the connectors as recognized by the connector gesture recognition routine.
Figure 5:
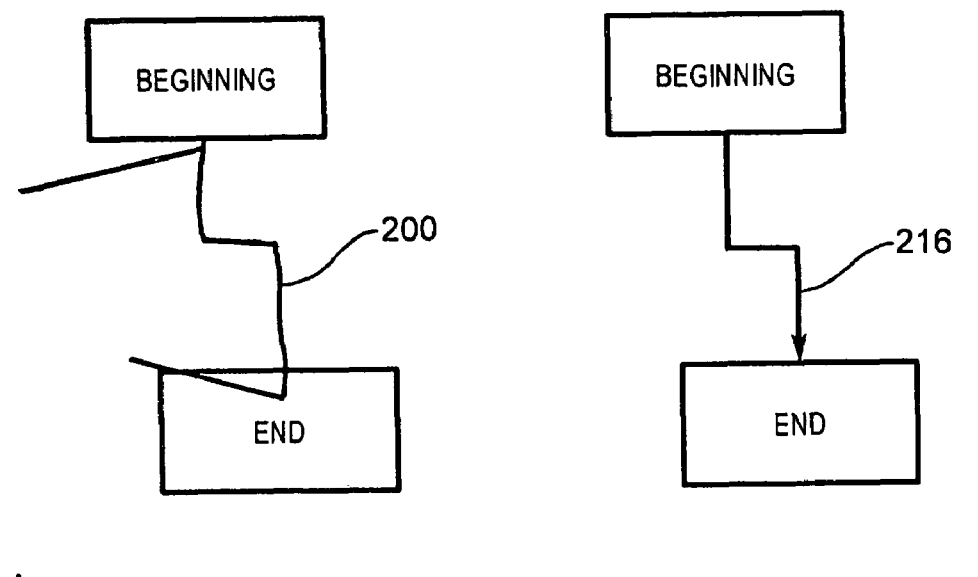
Figure 6:
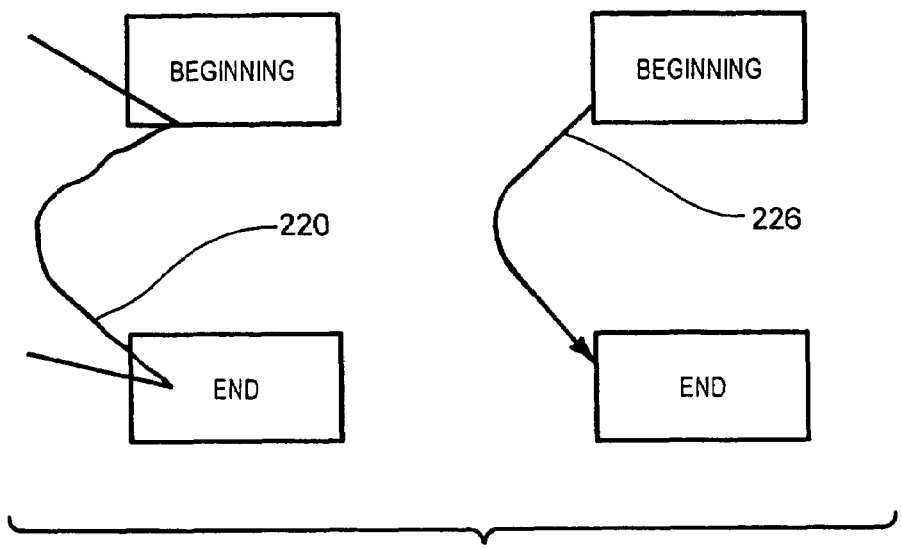
Figure 7:
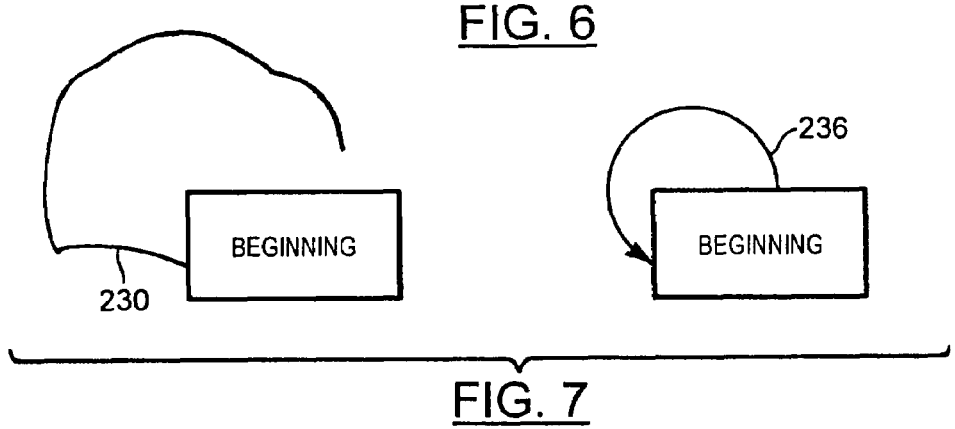
Figure 8:
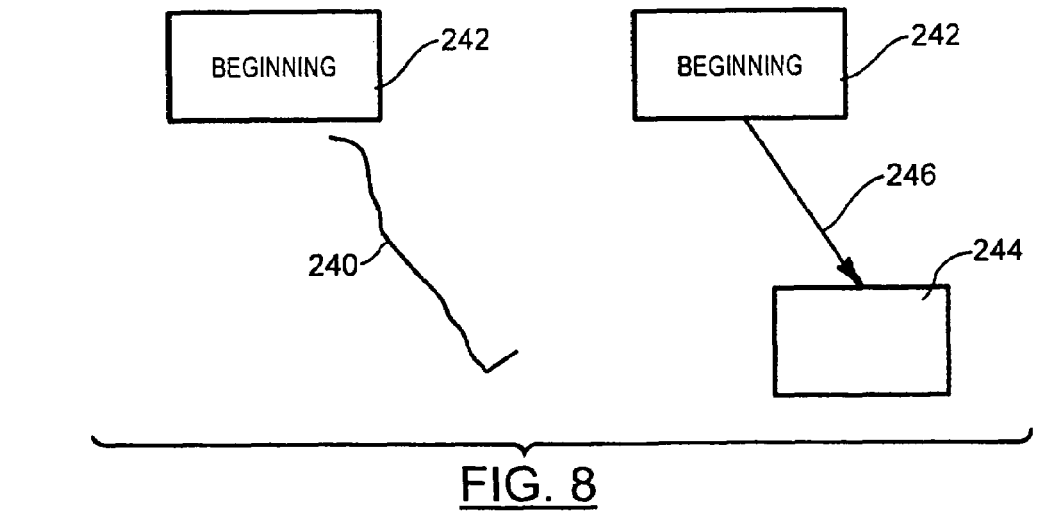

Turning now to FIGS. 4 to 10, examples of connector gesture recognitions are shown. As can be seen in FIG. 4, a freehand line 200 interconnecting two graphical objects 202 and 204 is recognized as a straight line 206. In FIG. 5, a freehand line 210 that is not straight and that has elbows is recognized as a right-angled line 216. In FIG. 6, a non-straight freehand line 220 is recognized as a curved line 226 and in FIG. 7, a winding line 230 is recognized as a circular line 236. FIG. 8 shows a freehand straight line 240 having a start point adjacent a graphical object 242. The end point of the freehand line 240 does not touch a graphical object. In this case, the user at step 122 has requested the connector gesture recognition routine to create a new graphical object 244 at the end of the freehand line and the freehand line is recognized as a straight line 246.

Figure 9:
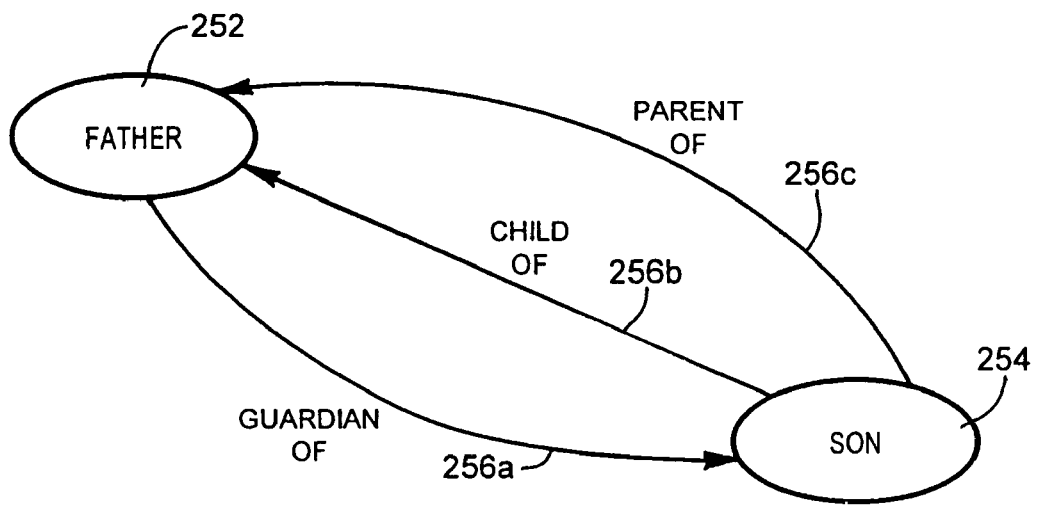
Figure 10:
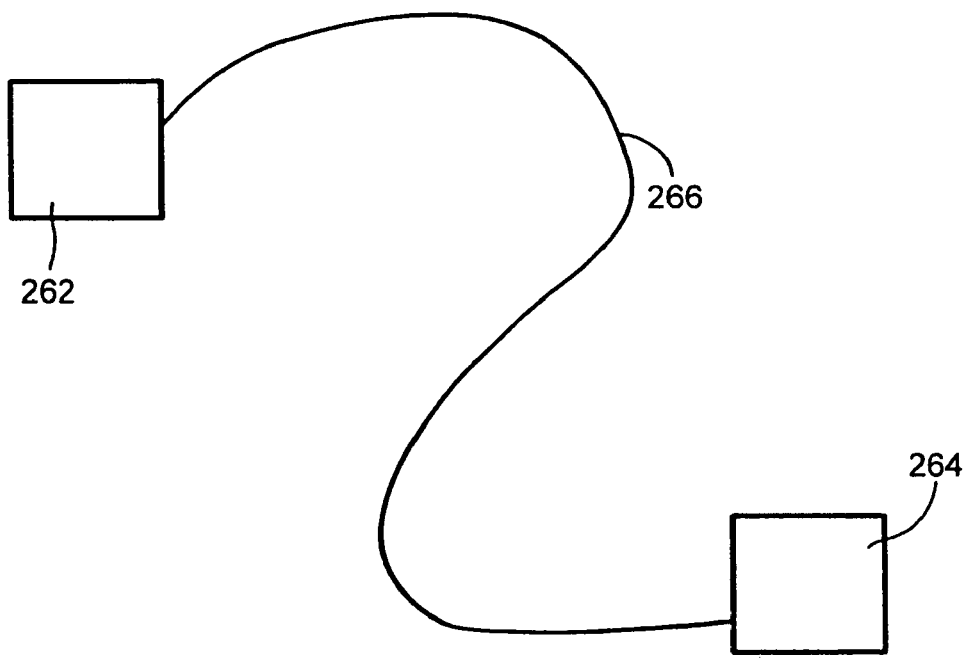

FIG. 9 shows relationships between graphical objects 252 and 254 in an object oriented program. As shown, three separate curved computer-generated connectors 256a to 256c extend between the graphical objects. The computer-generated connectors are created in manner that has been described above. It will be appreciated that any number of connectors may extend between pairs of graphical objects. FIG. 10 shows a computer-generated winding line 266 extending between a pair of graphical objects 262 and 264.

It will also be appreciated that the computer-generated connectors can be created without arrow heads, with single arrow heads or with double arrow heads. In addition, the various computer-generated connectors can be displayed in different colours using a software color tool.

Although the touch system has been described as switching between the pointer mode and the ink mode depending on the type of pointer used to contact the touch surface, this is for illustrative purposes only. For example, transitions between the pointer mode and ink mode can be achieved by selecting appropriate buttons on a small window that remains visible on the touch surface 14. In this manner, the same pointer can be used to generate mouse events or ink. The gesture responsive ink injection routine can be used in any touch system that includes a touch panel on which a computer image is presented. Such touch systems include active touch systems that make use of special pointers that emit signals such as infrared light, visible light, ultrasonic frequencies and electromagnetic frequencies in order to activate the touch surfaces. These touch systems also include passive surface acoustic wave or capacitive-type touch systems as well as camera-based touch systems such as that disclosed in International PCT Application No. WO 02/03316 to Smart Technologies Inc. et al., the assignee of the present invention.

It will also be appreciated that the gesture connector recognition routine may be run on basically any computing device where freehand connectors joining graphical objects are entered. A mouse, trackball, touch pad, or other pointing device may be used to create the freehand connectors.

During analysis of the freehand connectors, the freehand connectors need not touch graphical objects in order for the connector gesture recognition routine to extend computer-generated connectors from them. Rather, the freehand connectors simply need to be within a threshold distance of graphical objects. In addition, prompting the user to determine whether new graphical objects are to be created at the start and end points of freehand lines is optional. This feature may be disabled or designated as a default. When designated as a default, the connector gesture recognition routine creates new graphical objects at the start and end points of freehand lines automatically without requiring user input.

Although a preferred embodiment of the present invention has been described, those of skill in the art will appreciate that variations and modifications may be made without departing from the spirit and scope thereof as defined by the appended claims.

What is claimed is:

1. A computerized method of recognizing a freehand connector input into a computer application that joins graphical objects, said method comprising the steps of:

examining points along said freehand connector to determine the shape thereof;

replacing said freehand connector with a computer-generated connector approximating said freehand connector;

automatically joining each end of said computer-generated connector to a proximate graphical object if such a proximate graphical object exists; and automatically generating a new graphical object that is joined to at least one of the start and end points of the computer-generated connector if the at least one of the start and end points of said freehand connector is not proximate to a graphical object.

2. The computerized method of claim 1 wherein said freehand connector is input into said computer application in response to drawing made on a touch panel having a touch surface.

3. A system for recognizing a freehand connector input into a computer application that joins graphical objects, said system comprising:

means for examining points along said freehand connector to determine the shape thereof;

means for replacing said freehand connector with a computer-generated connector approximating said freehand connector;

means for automatically joining each end of said computer-generated connector to a proximate graphical object if it exists; and means for automatically generating a new graphical object that is joined to at least one of the start and end points of the computer-generated connector if the at least one of the start and end points of said freehand connector is not proximate to a graphical object.

4. A system according to claim 3 wherein said freehand connector is input into said computer application in response to drawing made on a touch panel having a touch surface.

5. A touch system comprising:

a touch panel having a touch surface;

a projection device presenting images that are visible on said touch surface; and a computer executing an applications program and being coupled to said touch panel and said projection device, said computer being responsive to contact output generated by said touch panel in response to proximity of a pointer to said touch surface and updating image data conveyed to said projection device so that images presented on said touch surface reflect pointer activity, said computer executing a connector gesture recognition routine, said connector gesture recognition routine performing recognition to convert a freehand connector drawn on said touch surface into a computer-generated connector approximating said freehand connector and for automatically connecting each end point of said computer-generated connector to a displayed graphical object if it exists, wherein said connector gesture recognition routine further generates automatically a new graphical object that is joined to at least one of the start and end points of the computer-generated connector if the at least one of the start and end points of said freehand connector is not proximate to a graphical object.

6. A computer readable medium having a computer program embodied thereon for recognizing a freehand connector, said computer program including:

computer program code for examining points along said freehand connector to determine the shape thereof;

computer program code for replacing said freehand connector with a computer-generated connector approximating said freehand connector;

computer program code for automatically joining each end of said computer-generated connector to a proximate graphical object if such a proximate graphical object exists; and computer program code for automatically generating a new graphical object that is joined to at least one of the start and end points of the computer-generated connector if the at least one of the start and end points of said freehand connector is not proximate to a graphical object.

* * * * *